United States Patent
Culshaw et al.

(10) Patent No.: US 9,841,795 B2
(45) Date of Patent: Dec. 12, 2017

(54) METHOD FOR RESETTING AN ELECTRONIC DEVICE HAVING INDEPENDENT DEVICE DOMAINS

(71) Applicants: Carl Culshaw, Wigan (GB); Sunny Gupta, Noida (IN); Thomas Henry Luedeke, Oberbergkirchen (DE); Deboleena Sakalley, Ghaziabad (IN)

(72) Inventors: Carl Culshaw, Wigan (GB); Sunny Gupta, Noida (IN); Thomas Henry Luedeke, Oberbergkirchen (DE); Deboleena Sakalley, Ghaziabad (IN)

(73) Assignee: NXP USA, Inc., Austin, TX (US)

( * ) Notice: Subject to any disclaimer, the term of this patent is extended or adjusted under 35 U.S.C. 154(b) by 183 days.

(21) Appl. No.: 14/492,711

(22) Filed: Sep. 22, 2014

(65) Prior Publication Data
US 2016/0085279 A1   Mar. 24, 2016

(51) Int. Cl.
*H03L 7/00* (2006.01)
*G06F 1/24* (2006.01)
*G06F 11/07* (2006.01)

(52) U.S. Cl.
CPC ............ *G06F 1/24* (2013.01); *G06F 11/0724* (2013.01)

(58) Field of Classification Search
CPC ......................................................... G06F 1/24
USPC ......................................................... 327/142
See application file for complete search history.

(56) References Cited

U.S. PATENT DOCUMENTS

| | | | |
|---|---|---|---|
| 7,089,413 B2 * | 8/2006 | Erickson | H04L 12/12 713/1 |
| 7,990,173 B1 * | 8/2011 | Tseng | H03K 19/0033 326/11 |
| 8,458,726 B2 | 6/2013 | Zimmer et al. | |
| 2008/0013396 A1 * | 1/2008 | Choi | G06K 19/077 365/226 |
| 2010/0045649 A1 * | 2/2010 | Boom | G02B 26/004 345/211 |
| 2010/0138640 A1 * | 6/2010 | Gilday | G06F 1/24 713/1 |
| 2010/0241282 A1 * | 9/2010 | Culshaw | G06F 11/00 700/295 |
| 2011/0022897 A1 | 1/2011 | Marshall et al. | |
| 2011/0276812 A1 * | 11/2011 | Lee | G06F 1/26 713/300 |

(Continued)

FOREIGN PATENT DOCUMENTS

| | | |
|---|---|---|
| WO | 03/021426 A2 | 3/2003 |
| WO | 2009035810 A1 | 3/2009 |

OTHER PUBLICATIONS

Freescale Semiconductor, Inc., "Chapter 60: System Reset Controller (SRC)," i.Mx 6Dual/6Quad Applications Processor Reference Manual, document No. IMX6DORM; Rev. 2, Jun. 2014; downloaded from <<https://community.freescale.com/docs/DOC-101783>> on Sep. 22, 2014; 35 pages.

*Primary Examiner* — Ryan Jager (57) ABSTRACT

A reset state control circuit adapted to reset independent device domains of an electronic device, said reset state control circuit comprising a capturing unit adapted to capture reset events; and a reset shaping logic adapted to change dynamically a reset control flow to reset device domains of said electronic device depending on a sequence of the reset events captured by said capturing unit.

16 Claims, 6 Drawing Sheets

(56) References Cited

U.S. PATENT DOCUMENTS

2014/0298005 A1* 10/2014 Culshaw .................. G06F 1/24
                                                              713/100
2015/0033047 A1*  1/2015 Byun ..................... G06F 1/3206
                                                              713/320

* cited by examiner

METHOD FOR RESETTING AN
ELECTRONIC DEVICE HAVING
INDEPENDENT DEVICE DOMAINS

FIELD OF THE INVENTION

The invention relates to a method for resetting an electronic device having at least one independent domain and to a reset state control circuit having a reset shaping logic changing dynamically a reset control flow to reset the device domains.

BACKGROUND OF THE INVENTION

An electronic device, in particular a system on chip, SoC, can comprise a plurality of electronic components in different device domains of the electronic device. In a complex electronic device, there can be multiple power domains having electronic components which are supplied with a specific supply voltage. In an electronic device, a reset clears any pending errors and brings the electronic device back to a normal operation condition or an initial operation state. In case of an error such as an abnormal power loss, the electronic device comprising for instance an embedded system is able to reset itself. In an electronic device, there can be multiple clocking domains having different clock/reset circuits. A sudden occurring error can sometimes be fixed by removing and restoring the power by making a device reset of the complete electronic device. Some electronic devices have a dedicated reset button which can be pressed by a user. Further, a soft reset can be performed by restarting a system software without resetting the hardware of the electronic device.

In a conventional system on chip, reset schemes or reset control flows are implemented, whereby the electronic device is reset upon a particular event occurring. In a system, such a reset scheme can be divided into separate levels of reset such as a destructive reset level and one or more functional reset levels. In a functional reset case, only certain elements or components of the system on chip are reset, while in a destructive reset case, a complete reset of the entire system on chip is performed. Reset events can be internal reset events generated by internal reset sources within the electronic device or external reset events received from external reset sources connected to the electronic device. In a conventional system on chip such as a microcontroller unit, a reset scheme or a reset control flow can be fixed in hardware to follow a predetermined reset route. In a conventional system on chip, a single, linear reset scheme can be activated by a predetermined reset event such as a pin assertion, internal watchdog or software event. In more complex conventional systems on chip or electronic devices, a linear reset scheme can be entered at different points in the reset cycle but the reset route remains the same. Once the reset scheme or reset control flow has been entered, the order of the domain's or component's reset is fixed and cannot be influenced by any further reset event. Accordingly, when the reset cycle has been completed, a further reset trigger or reset event can be accepted.

SUMMARY OF THE INVENTION

The present application provides a method for resetting an electronic device and a reset state control circuit within a system on chip as described in the accompanying claims.

Specific embodiments of the different aspects of the present application are set forth in the dependent claims.

These and other aspects of the invention will be apparent from and elucidated with reference to the examples described hereinafter.

BRIEF DESCRIPTION OF THE DRAWINGS

Further details, aspects and embodiments of the present invention will be described, by way of example only, with reference to the drawings. In the drawings, like reference numbers are used to identify like or functionally similar elements. The elements in the figures are illustrated for simplicity and clarity and have not necessarily been drawn to scale. In fact, the dimensions of the various features may be arbitrarily increased or reduced for clarity of discussion.

DETAILED DESCRIPTION OF THE PREFERRED EMBODIMENTS

The teaching of the present application will now be described with reference to exemplary, non-limiting examples of the reset state control circuit. Because the illustrated examples of the present application may, for the most part, be implemented using electronic components and circuits known to those skilled in the art, details will not be explained in any greater extent than that considered necessary as illustrated above, for the understanding and appreciation of the underlying concepts of the present application and in order not to obfuscate or distract from the teachings of the present application.

It is understood that the following disclosure provides many different examples capable of implementing different features. Specific examples of components and arrangements are described below to simplify and thus clarify the present disclosure. These are, of course, merely examples and are not intended to be limiting. In many instances, the features of one embodiment may be combined with the features of other embodiments.

Figure 1:
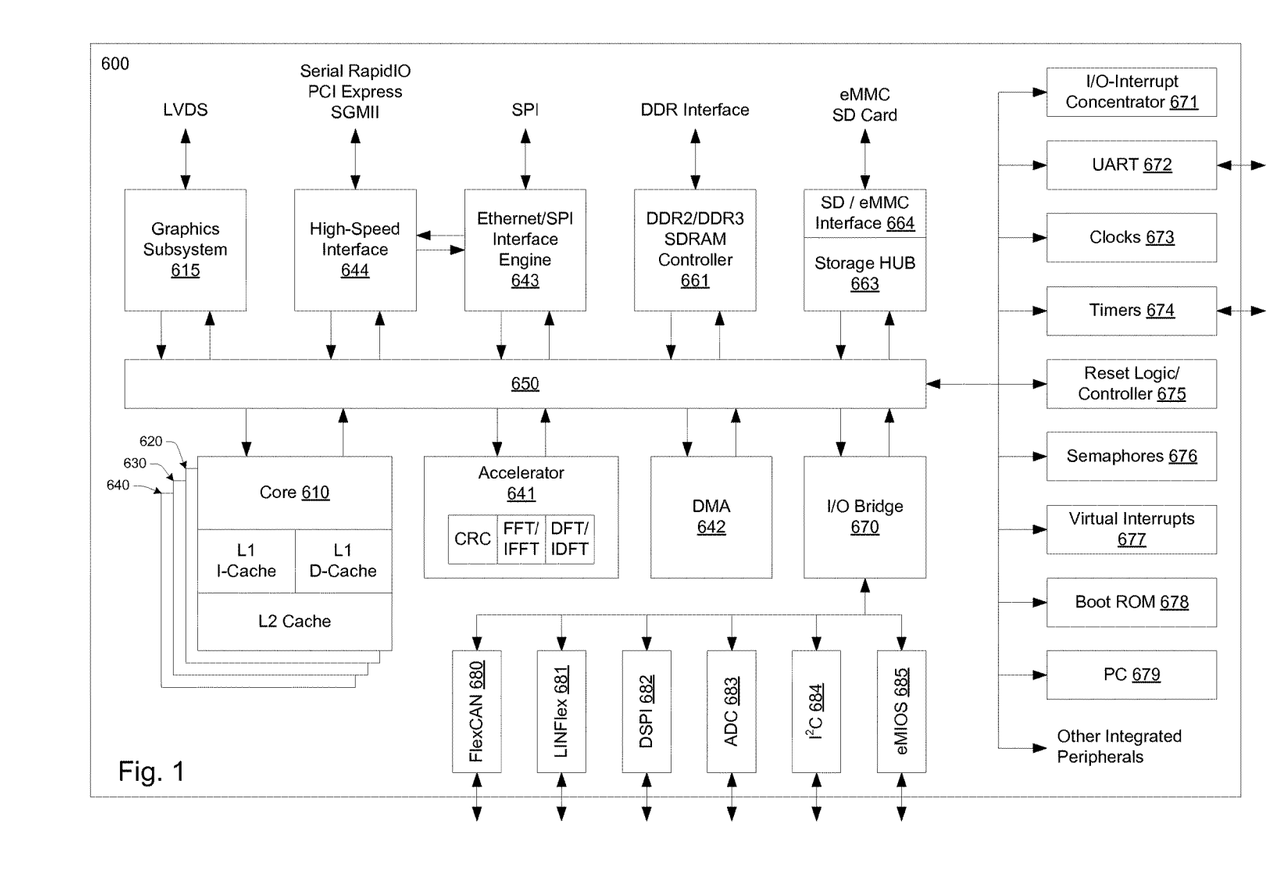
FIG. 1 schematically illustrates a simplified block diagram of a multi-core system on chip (SoC) with multiple processor cores and shared integrated peripherals according to an example of the present application.

Referring now to FIG. 1, there is shown a simplified schematic diagram of a multi-core system on chip 600 having multiple processor cores 610, 620, 630, and 640. The multi-core system on chip 600 should be understood as one example of a data processing device or a data processing system in the context of the present application. As illustrated, each of the processor cores 610, 620, 630, 640 is coupled to one or more levels of cache memory, such as an L1 instruction cache (I-Cache), L1 data cache (D-Cache), and/or L2 cache. While the processor cores 610, 620, 630, 640 may be identically designed or homogenous, the multi-core SoC may also include one or more cores having a different design. For example, the depicted multi-core SoC 600 also includes an accelerator 641, which may include one or more processor cores for supporting hardware acceleration for DFT/iDFT and FFT/iFFT algorithms and for CRC processing. Each processor core is coupled across an interconnect bus 650 to one or more memory controllers 661, which are coupled in turn to one or more banks of system memory (not shown). The interconnect bus 650 also couples the processor cores to a Direct Memory Access (DMA) controller 642, network interface 643, a high speed serial interface 644, and to other hardware-implemented integrated peripherals 671 to 679. The interconnect bus 650 may be a coherency fabric.

Each of the processor cores 610, 620, 630, 640 may be configured to execute instructions and to process data according to a particular instruction set architecture (ISA), such as x86, PowerPC, SPARC, MIPS, and ARM, for example. Those of ordinary skill in the art also understand the present invention is not limited to any particular manufacturer's microprocessor design. The processor core may be found in many forms including, for example, any 32-bit or 64-bit microprocessor manufactured by Freescale, Motorola, Intel, AMD, Sun or IBM. However, any other suitable single or multiple microprocessors, microcontrollers, or microcomputers may be utilized. In the illustrated embodiment, each of the processor cores 610, 620, 630, 640 may be configured to operate independently of the others, such that all cores may execute in parallel. In some embodiments, each of cores may be configured to execute multiple threads concurrently, where a given thread may include a set of instructions that may execute independently of instructions from another thread. Such a core may also be referred to as a multithreaded (MT) core. Thus, a single multi-core SoC 600 with four cores will be capable of executing a multiple of four threads in this configuration. However, it should be appreciated that the invention is not limited to four processor cores and that more or fewer cores can be included. In addition, the term "core" refers to any combination of hardware, software, and firmware typically configured to provide a processing functionality with respect to information obtained from or provided to associated circuitry and/or modules (e.g., one or more peripherals, as described below). Such cores include, for example, digital signal processors (DSPs), central processing units (CPUs), microprocessors, and the like. These cores are often also referred to as masters, in that they often act as a bus master with respect to any associated peripherals. Furthermore, the term multi-core (or multi-master) refers to any combination of hardware, software, and firmware that that includes two or more such cores (e.g., cores 610 and 620), regardless of whether the individual cores are fabricated monolithically (i.e., on the same chip) or separately. Thus, a second core may be the same physical core as first core, but has multiple modes of operation (e.g., a core may be virtualized).

As depicted, each processor core (e.g., 610) may include a first level (L1) cache, which includes a data cache (D-Cache) and an instruction cache (I-Cache). In addition, a second level of cache memory (L2) may also be provided at each core, though the L2 cache memory can also be an external L2 cache memory, which is shared by one or more processor cores. The processor core 610 executes instructions and processes data under control of the operating system (OS) which may designate or select the processor core 610 as the control or master node for controlling the workload distribution amongst the processor cores 610, 620, 630, 640. Communication between the cores 610, 620, 630, 640 may be over the interconnect bus 650 or over a crossbar switch and appropriate dual point to point links according to, for example, a split-transaction bus protocol such as the HyperTransport (HT) protocol (not shown). Those skilled in the art will understand that the control functionality may not be exclusively assigned to one of the processor cores 610, 620, 630, 640. The control functionality may be distributed among the processor cores 610, 620, 630, 640.

The processor cores 610, 620, 630, 640 and accelerator 641 are in communication with the interconnect bus 650 which manages data flow between the cores and the memory. The interconnect bus 650 may be configured to concurrently accommodate a large number of independent accesses that are processed on each clock cycle, and enables communication data requests from the processor cores 610, 620, 630, 640 to external memory and/or an on-chip memory (not shown), as well as data responses therefrom. The external memory and/or an on-chip memory may comprise volatile memory technology and/or non-volatile memory technology. In selected embodiments, the interconnect bus 650 may include logic (such as multiplexers or a switch fabric, for example) that allows any core to access any bank of memory, and that conversely allows data to be returned from any memory bank to any core. The interconnect bus 650 may also include logic to queue data requests and/or responses, such that requests and responses may not block other activity while waiting for service. Additionally, the interconnect bus 650 may be configured as a chip-level arbitration and switching system (CLASS) to arbitrate conflicts that may occur when multiple cores attempt to access a memory or vice versa.

The interconnect bus 650 is in communication with main memory controller 661 to provide access to the optional SOC internal memory or main memory (not shown). Memory controller 661 may be configured to manage the transfer of data between the multi-core SoC 600 and system memory, for example. In some embodiments, multiple instances of memory controller 661 may be implemented, with each instance configured to control a respective bank of system memory. Memory controller 661 may be configured to interface to any suitable type of system memory, such as Double Data Rate or Double Data Rate 2 or Double Data Rate 3 Synchronous Dynamic Random Access Memory (DDR/DDR2/DDR3 SDRAM), or Rambus DRAM (RDRAM), for example. In some embodiments, memory controller 661 may be configured to support interfacing to multiple different types of system memory. In addition, the Direct Memory Access (DMA) controller 642 may be provided which controls the direct data transfers to and from system memory via memory controller 661.

The interconnect bus 650 is in communication with storage HUB 663 to provide access to mass storage (not shown). The storage HUB 663 may be configured to manage the transfer of data between the multi-core SoC 600 and mass storage units, for example. The storage HUB 663 may further include one or more interfaces specific for the technology used by the mass storage units. Herein, the storage HUB 663 is exemplarily illustrated to include a SD/eMMC Interface 664, which is provided to allow for access to SD (Secure Data), MMC (MultiMediaCard) cards (not shown) and/or eMMC (embedded MultiMediaCard) (not shown). Both storage technologies are implemented based on non-volatile flash memory technology. In some embodiments, multiple instances of storage HUB 663 and/or interfaces provided with the storage HUB 663 may be implemented, with each instance configured to control a respective bank of system memory. Memory storage HUB 663 may be configured to interface to any suitable type of mass storage interfacing standards including in particular flash memory storage standards (SD, MMC), SAS (Serial Attached SCSI), SATA (Serial ATA) and the like.

The multi-core SoC 600 may comprise a dedicated graphics sub-system 200. The graphics sub-system 200 may be configured to manage the transfer of data between the multi-core SoC 600 and graphics sub-system 200, for example, through the interconnect bus 650. The graphics sub-system 200 may include one or more processor cores for supporting hardware accelerated graphics generation. The graphics generated by the graphics sub-system 200 may be outputted to one or more displays via any display interface such as LVDS, HDMI, DVI and the like.

As will be appreciated, the multi-core SoC 600 may be configured to receive data from sources other than system memory. To this end, a network interface engine 643 may be configured to provide a central interface for handling Ethernet and SPI interfaces, thus off-loading the tasks from the cores. In addition, a high-speed serial interface 644 may be configured to support one or more serial RapidIO ports, a PCI-Express Controller, and/or a serial Gigabit Media Independent Interface (SGMII). In addition, one or more hardware-integrated peripherals (IP) may be provided which are configured to couple the cores to external boot and/or service devices. The one or more interfaces may be coupled through one or more I/O bridges 670 to the interconnect bus 650 of the SoC 600.

The one or more hardware-integrated peripherals (IP) may include, without being limited thereto: I/O interrupt concentrators 671, UART (universal asynchronous receiver/transmitter) device(s) 672, clock(s) 673, timer(s) 674, reset 675, hardware semaphore(s) 676, virtual interrupt(s) 677, Boot ROM 678, Power Controller (PC) 679, FlexCAN (enhanced CAN; CAN: Controller Area Network) interface 680, LinFlex (Serial Communication; LIN: Local interconnect network) interface 681, DSPI (Deserial Serial Peripheral Interface) 682, analogue-to-digital converter (ADC) 683, I2C (Inter-Integrated Circuit) interface 684, an eMIOS (enhanced Modular Input Output System) 685, GPIO (General-purpose input/output) interface ports, and/or other modules.

Instructions for the operating system, applications, and/or programs may be in mass storage or memory, which are in communication with processor cores 610, 620, 630, 640 through communications fabric 650. In these illustrative examples, the instructions are in a functional form on a non-transitory tangible medium such as a persistent mass storage. These instructions may be loaded into memory for running by processor cores 610, 620, 630, 640. The processes of the different examples may be performed by processor cores 610, 620, 630, 640 using computer-implemented instructions, which may be in a memory. These instructions are referred to as program code, computer usable program code, or computer readable program code that may be read and run by one or more processor cores 610, 620, 630, 640 in the SoC 600. The program code in the different examples may be embodied on different physical or computer readable non-transitory tangible storage media.

Figure 2:
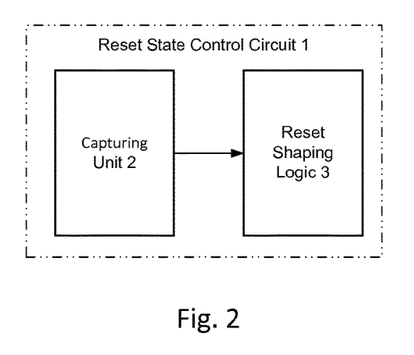
FIG. 2 schematically illustrates a simplified block diagram of a reset state control circuit according to an example of the present application.

Referring now to FIG. 2, the reset state control circuit 1 according to an example of the present application is adapted to reset independent device domains of an electronic device, in particular independent device domains of a system on chip SOC. The reset state control circuit 1 comprises a capturing unit 2 adapted to capture reset events, and a reset shaping logic 3 adapted to change dynamically a reset control flow to reset different independent device domains of the electronic device depending on a sequence of the reset events captured by the capturing unit 2. The capturing unit 2 may comprise capturing blocks adapted to capture internal or external reset events received from internal or external reset sources. The capturing unit 2 can receive signals indicating reset events from one or more reset sources within the system on chip and/or from one or more external reset sources operably connected to the system on chip. Reset sources may be for instance reset controller circuits provided for independent device domains of the electronic device or system on chip. The independent device domains may be for instance multiple independent power domains with individually controlled supply voltages. The independent device domains may have the ability to function asynchronously to each other. A device domain may be further a functional component as described above with reference to FIG. 1. For instance, a domain may be an integrated peripheral, a one or more processing cores, a controller and the like.

The reset shaping logic 3 connected to the capturing unit 2 is adapted to change dynamically the reset control flow to reset the different independent device domains. In an example, the reset shaping logic 3 may be programmable. In an exemplary implementation, the reset shaping logic 3 may be formed by a hardwired circuit. The reset shaping logic 3 of the reset state control circuit 1 is adapted to change dynamically the reset control flow to reset the independent device domains depending on a sequence order of the captured reset events. In a further example, the reset shaping logic 3 is further adapted to change dynamically the reset control flow depending on the sequence order of the captured reset events and further on a time duration of the captured reset events. In a further example, the reset shaping logic 3 is adapted to change the reset control flow to reset the device domains depending on the types of the captured reset events.

In further examples, the reset shaping logic 3 takes into account further conditions or parameters. In an example, the reset shaping logic 3 changes the reset control flow further dynamically depending on current operation modes and/or ongoing and/or existing operation states of the different device domains or depending on the current operation mode or current operation state of the electronic device or SoC. In a still further example, the reset shaping logic 3 is adapted to change dynamically the reset control flow in response to internal control signals generated by a control unit of the electronic device. In a still further example, the reset shaping logic 3 is further adapted to change dynamically the reset control flow in response to external control signals received by the electronic device from external control units. The reset events provided by the different reset sources may be applied in parallel to the capturing unit 2 of the reset state control circuit 1 as exemplarily illustrated in FIG. 2. In an example, the capturing unit 2 may comprise an internal masking unit, which is adapted to mask the applied reset events. In an example, the masking unit may be programmable to select a specific group of reset events as input for the reset shaping logic 3. The masking pattern to mask the reset events may be programmable. In a further example, the masking pattern to mask the reset events may change over time, for instance periodically.

In an example, the received reset events captured by the capturing unit 2 are associated with time stamps. Time stamps are assigned to each captured reset event and a time difference between different captured reset events may be determined on the basis of the assigned time stamps. The time stamps may be generated by an internal time stamp generation unit of the system on chip. The assigned time stamps may also be used for later analysis and data processing. Reset sources connected to the capturing unit 2 may be categorized into different types such as functional event sources or destructive event sources. The type of resets generated depend upon the source of reset. A reset event is indicative of at least one condition met in response to which a source and/or condition specific reset is to be carried out.

A destructive reset source is associated with an event related to a critical error or dysfunction. Such a critical error or dysfunction may be a hardware error or dysfunction. When a destructive event source indicates a destructive reset, the full reset scheme is applied, which means that all domains of a device are reset.

A functional reset source is associated with an event related to a less-critical error or dysfunction. When a functional reset occurs a limited number of domains of a device is reset and the operational states of the remaining domains are maintained.

In an example, a reset control flow may be shaped by the reset shaping logic 3 depending on the type of reset. In an example, the device domains reset by said reset shaping logic 3 are hold in a reset state during reset phases. The time duration of the reset phases may depend on the sequence order of the captured reset events and/or the time duration of the captured reset events. In a further example, the time duration of the reset phases may also depend on the types of the captured reset events or the current operation states of the different device domains of the electronic device. In a still further example, the time duration of the reset phases may also be adjusted depending on the current operation conditions of the different device domains of the electronic device. The capturing unit 2 and the reset shaping logic 3 may be integrated in a single reset state control circuit 1 as illustrated in FIG. 1. The capturing unit 2 and the reset shaping logic 3 may likewise be separate units in the same or different device domains of the system on chip. In an exemplary implementation, the capturing unit 2 can form itself a reset source. Accordingly, if the capturing unit 2 itself fails, a specific reset event is provided to the reset shaping logic 3, which changes the reset control flow accordingly in response to the reset event.

In an example, the reset shaping logic 3 may trigger a further response action in response to the captured reset events. For instance, the reset shaping logic 3 may be adapted to force or drive the complete electronic device or at least some device domains in an immediate safe state condition. For example, IO ports or IO pads of the electronic device may be driven in an open circuit condition for allowing elements of the system to operate by leaving the main reset asserted to the remainder of the system on chip.

It is possible to maximize an availability of key domains or key areas of the system on chip SoC by restricting or selecting which reset sources have an impact on the behavior. It is possible to maximize the availability of the key areas or key domains of the system on chip by always initiating a least severe reset response or reset control flow and by escalating or increasing the severity based on further reset events. The electronic device can be a safety device, wherein the device behavior is guaranteed in all operation modes including a reset recovery. The reset shaping logic 3 provides for an adaptive reset scheme or reset control flow that is dynamically adjusted in response to a combination of internal and/or external captured reset events.

The reset state control circuit 1 allows for different elements, components or domains of the system on chip SoC to be available at different times depending on the captured order of reset events. An example is the degree of a flash module availability. Depending on the sequence and duration of reset events, in particular external reset events, the flash module may be disabled, read only or support full read/write capability. Further, a complex electronic device may have multiple power domains and voltage islands. In conventional electronic devices, these domains are controlled by a singular reset scheme, such as a linear reset scheme wherein each device domain of the conventional device is held in a reset state until the overall system event reaches a correct state of operation. With the reset state control circuit 1 according to the present application, as illustrated in FIG. 2, it is possible to allow each domain to dynamically have its reset scheme modified and to independently exit the reset state. This makes it possible to start some device domains much sooner and to deal with critical activities, long before other parts of the electronic device are capable of operating. In an example, some sections or domains of the electronic device may be permanently held in a reset state depending on external operation conditions. The reset state control circuit 1 illustrated in FIG. 2 allows to change the reset control power or reset control flow depending on an arrival of the system events and system status. The reset state control circuit 1 changes a linear reset control flow to an adaptive reset control flow. During a reset operation, the reset control flow may be further dynamically adapted in response to a combination of internal and external events. An adaptive reset control flow may be shaped according on which one of the reset events arrives first in time. As further reset events arrive, the reset flow is dynamically adapted depending on the time of arrival and sequence order of further reset events. The reset events may be software triggered or hardware triggered events. In particular safety-critical safety components should be available to execute at an appropriate time. This may vary depending on the reset event and a condition of the system on chip. Different elements or domains of the system on chip may operate at different times. Such operation may facilitate an early provision of safety components, in particular critical safety components, for operation.

In an example, a unique safety checksum of communication and/or monitoring of other elements of the system may be created. For instance, an adaptive reset control flow, such as a sequence of reset control signals, which reset different chip or device domains, may be applied as an input signal to a checksum generation circuit, which calculates a checksum depending on the reset control flow outputted by the reset shaping logic 3. The checksum generation unit may generate a reset checksum, which may be further transmitted to a receiving monitoring component, which is either located on chip or off chip. The generated reset checksum may be compared with an expected checksum to decide, whether the reset control flow meets predefined conditions. This allows an external monitoring of the reset control flow generated by the reset shaping logic 3 so that the reset scheme becomes even more robust. The reset shaping logic 3 and the reset control flow may be dynamically adapted. For instance in safety-critical applications, safety triggers can be used to control directly how the reset control flow is applied.

The reset checksum generated by the reset checksum generation unit may in an example be communicated to a monitoring component connected to the system on chip, for instance via a communication interface such as a SPI port. In this example, the reset checksum generated by the integrated checksum generation unit is outputted via dedicated checksum pins to the external control or monitoring component. The external control or monitoring component may compare the received reset checksum and a predefined reset checksum to detect, whether the reset scheme within the system on chip is performed correctly. The reset shaping performed by the reset shaping logic 3 is based on input signals, in particular reset event indicating signals, the combination and the sequence order thereof. It is possible to use sequences of reset events to escalate and to change the reset entry for each reset domain separately. Several reset events and the sequence thereof are taken into account by the reset shaping logic 3 to decide on an individual reset entry per device domain. In this way, the availability of the whole system on chip SoC is improved or increased. The reset state control circuit 1 as illustrated in FIG. 2 may be used for any kind of semiconductor chip having several reset sources and allows for more complex entry and exit conditions for the resets. The reset state control circuit 1 as shown in FIG. 2 may be integrated in a system on chip SoC. The reset state control circuit 1 may be also integrated in a MCU (microcontroller unit) or an application processor.

Figure 4:
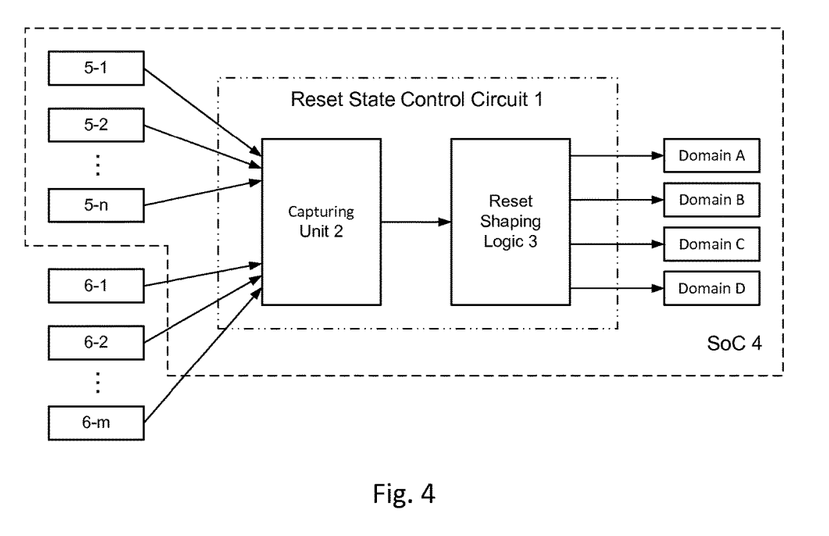
FIG. 4 schematically illustrates a simplified block diagram for illustrating an exemplary system on chip according to a further example of the present application.

FIG. 4 schematically shows a simplified back diagram of an implementation of an exemplary reset state control circuit 1 having a capturing unit 2 and a reset shaping logic 3 as part of a system on chip 4 such as the SoC 600 described above with reference to FIG. 1. The system on chip 4 comprises several internal reset sources 5-1, 5-2, . . . , 5-n, as illustrated in FIG. 4. The number n of internal reset sources 5-i can vary. The internal reset sources 5-i are operably connected via internal signal lines or one or more busses to the capturing unit 2 of the reset state control circuit 1, as illustrated in FIG. 4. The capturing unit 2 also receives reset event indicating signals from external reset sources 6-1, 6-2, . . . , 6-m, as illustrated in FIG. 4. The number m of external reset sources 6-i can also vary. Each reset source is enabled to indicate a reset event by supplying a reset event indicating signal to the capturing unit 2 being operably connected or coupled to the external reset sources 6-1, 6-2, . . . , 6-m via signals lines, interfaces or busses. The capturing unit 2 may comprise a masking unit to select one or more internal and/or external reset events and/or specific groups of internal and/or external reset events. In an example, the capturing unit 2 may assign a time stamp to each received reset event, which is used by the reset shaping logic 3 to evaluate a sequence order of the received and captured reset events. Time stamps may be generated by a time stamp generation unit integrated in the capturing unit 2. The external reset sources 6-i may be connected to the system on chip 4 via pins.

In the example shown in FIG. 4, the system on chip 4 comprises a reset state control circuit 1, which is adapted to control the reset state of different domains within the system on chip 4. In the shown example of FIG. 4, the system on chip 4 comprises four independent device domains, which are schematically indicated as domain A, domain B, domain C and domain D. Number and size of the different domains can vary. For example, the domains A to D in the shown example of FIG. 4 may be domains with different power supply voltages, functional components such as integrated peripheral or the like. The reset shaping logic 3 is configured to adapt dynamically a reset control flow to reset the different device domains A, B, C, D depending on the sequence of reset event indicating signals or the sequence order of the reset event indicating signals captured by the capturing unit 2.

Figure 5:
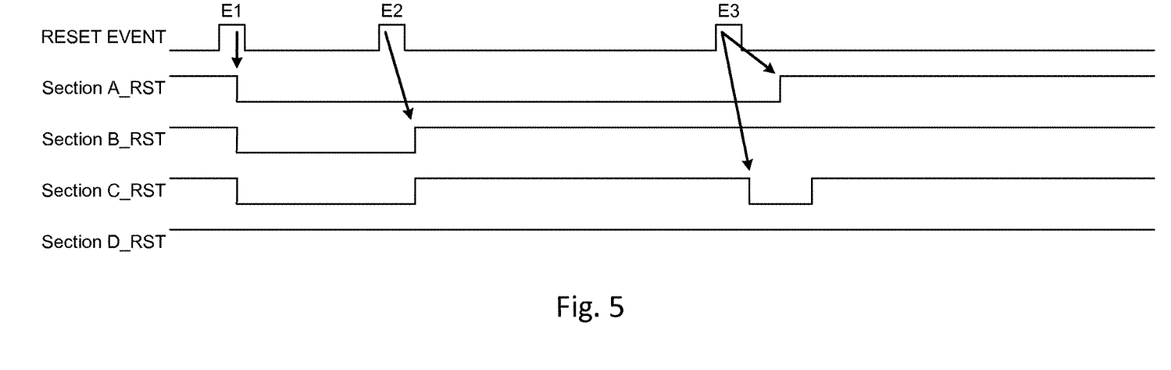
FIG. 5 shows a schematic signal diagram for illustrating an exemplary operation of a reset state control circuit according to an example of the present application.

FIG. 5 shows schematic signal diagrams for illustrating an exemplary operation of the reset state control circuit 1 shown in FIG. 4. The different domains or sections may be reset independently as illustrated. In the shown example, there are three reset events, e.g., as a first event E1 a power glitch followed by a tamper detect as a second reset event E2. In the signal diagram of FIG. 4, a logic high value indicates a normal operation state and a logical low level indicates a reset state of the respective section or domain.

In the shown example, domain D is insensitive to reset events and is not reset. Domain B and domain C are affected by a power glitch as the first reset event E1 and by a tamper E2 event before returning to the normal operation mode. Domain A exits the reset state after an open circuit reset event E3 follows the tamper detect event E2 and the power glitch event E1.

Figure 6:
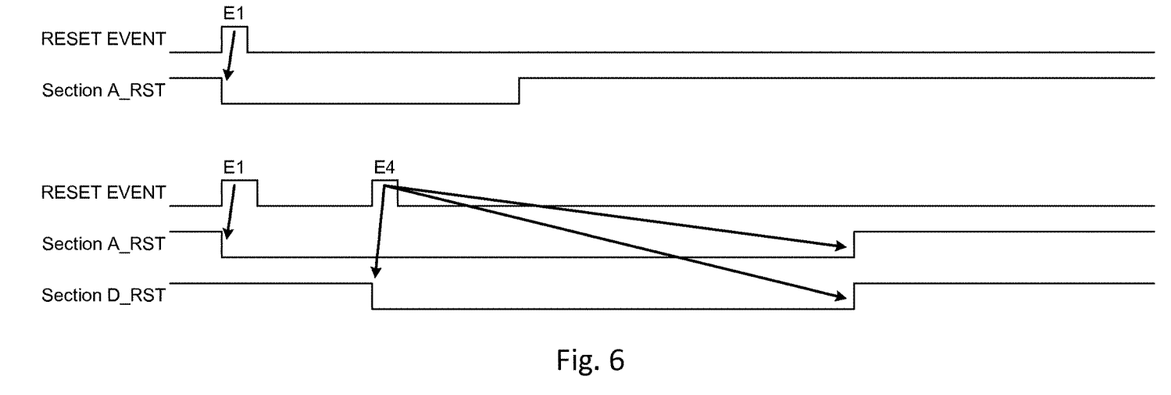
FIG. 6 schematically illustrates a further exemplary signal diagram for showing an exemplary operation of a reset state control circuit according to an example of the present application.

FIG. 6 shows a further schematic signal diagram for illustrating an exemplary operation of the reset state control circuit 1 according to the present application. In the shown example, when a power glitch reset event E1 occurs, only domain A is reset, as illustrated. However, when the power glitch reset event E1 is followed by an ECC (Error Correction Coding) error event E4, in particular within a predefined period, e.g. the domain A being in reset state, a more severe response is required and, hence, the domain A and the domain D are reset. Further, since more than one domain entered a reset state, the reset exit may also be delayed or prolonged, as illustrated in FIG. 6. Accordingly, as can be seen in FIGS. 5 and 6, the reset control flow, e.g., the control signals driving the one or more domains in reset state and releasing the reset state, is adapted dynamically depending on the sequence of captured reset event indicating signals. A sequence of reset event indicating signals comprising a power glitch reset event E1 followed in a predetermined period by an ECC error reset event E4 results to resets of both domains A and D, as illustrated in FIG. 6. If an ECC error reset event E4 does not follow the power glitch reset event E1, only domain A is reset. FIG. 6 shows only an exemplary reset control flow. For example, if the ECC error reset event E4 follows the power glitch event E1 within a predetermined period, the reset state of another domain may be lifted and a further domain may enter the reset state. In the signal diagram of FIG. 6, the reset control flow depends on the sequence or order of the captured reset event indicating signals. In further examples, not only the reset event indicating signal order but also other parameters relating to the reset event indicating signals are taken into account by the reset shaping logic 3. For instance, the time duration between two reset event indicating signals may be considered to adapt the reset control flow generated by the reset shaping logic 3. For instance, if the ECC error reset event E4 shown in FIG. 6 follows substantially immediately the power glitch reset event E1, e.g. within a time period of 10 milliseconds, this may result to another reset response or reset control flow as in other circumstances when the ECC error reset event E4 follows the power glitch reset event E1 later than e.g. 10 milliseconds. Further, the types of the captured reset event indicating signals may determine the reset control flow triggered by the reset shaping logic 3. For instance, the power glitch reset event E1 is categorized as a destructive reset event and the ECC error reset event E4 is categorized as a functional reset event. A functional reset event following a destructive reset event may result to a different reset control flow than a functional reset event followed by a destructive reset event. Other parameters may be also considered for adapting the reset control flow as well. For instance, a reset control flow may be adapted dynamically depending on the operation mode of the respective device domain or the operation mode of the device. Further, the reset events may be categorized into internal reset events and external reset events. In an example, a sequence of internal reset events may result to a different reset control flow than a sequence of external reset events.

In an example, different kinds and types of reset events captured by the capturing unit 2 may be filtered by a masking unit of the capturing unit 2. Such a masking unit may comprise a programmable masking register for selecting reset events. Digital values or patterns stored in the masking register may be programmable in depenance of the requirement of an application. Further, the masking bits stored in the masking register may be changed over time, for instance periodically every millisecond. For example, the masking unit may filter at point in time t1 all external reset event indicating signals and at another point in time t2 all internal reset event indicating signals. In another example, the masking unit may filter at a specified point in time all functional reset event indicating signals and at another point in time all destructive reset event indicating signals. Further, the masking unit may filter any predefined combination of internal and/or external reset event indicating signals, which indicate a defined reset condition. In a further example, not only the types of the reset events and the time difference between the reset event indicating signals, but also the duration of the reset events may be evaluated to adapt the reset control flow generated by the reset shaping logic 3. For instance, if the power glitch reset event E1 illustrated in FIG. 6 lasts longer than a predetermined period, the reset control flow can be adapted dynamically by the reset shaping logic 3. For instance, if the power glitch reset event E1 lasts less than 2 milliseconds, the reset shaping logic 3 outputs a first reset control flow. If the power glitch reset events E1 last longer than 2 milliseconds, the reset shaping logic 3 outputs a second reset control flow. Further parameters influencing the reset control flow outputted by the reset shaping logic 3 are internal control signals generated by a control unit of the system on chip SoC and external control signals applied to the device from an external control unit. Control signals may influence the data content of the masking register of the masking unit within the capturing unit 2. In a still further example, the capturing unit 2 may comprise delay circuits to delay the received reset event indicating signals. For instance, a reset event indicating signal from a first internal or external reset source may take longer to arrive at the capturing unit 2 than another reset event indicating signal received from another reset source located for instance in the vicinity of the capturing unit 2. In an example, the delay circuits of the capturing unit 2 may be adjusted to compensate the signal run time on the signal line between respective reset sources and the capturing unit 2.

Figure 7:
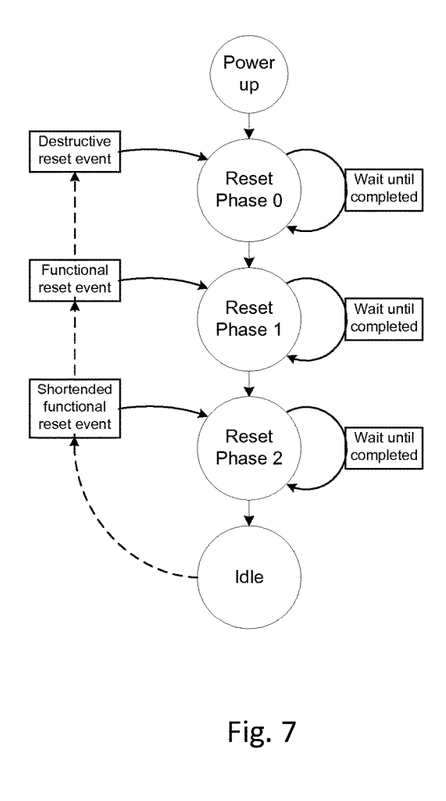
FIG. 7 shows a schematic state machine diagram for illustrating an exemplary operation of a linear reset scheme.

A schematic state machine diagram for generating a linear reset flow diagram is depicted for the sake of illustration in FIG. 7. A reset generation module is configured to generate a reset control flow or reset sequence in response to receiving a signal indicating a reset event. The reset generation module is provided to reset the parts of the device based on the signalized reset events. For the sake of illustration, the reset sources may issue different types of reset events including power-on reset event, destructive reset events, functional reset events and shortened functional reset events. Once a signal indicating a reset event, the reset generation module, which may be also denoted as a reset sequencer outputting a sequence of signals driving parts of the device to reset, performs the reset phases starting from the entry point, which depends on the type of reset event signalized to the reset generation module. The reset generation module comprises three reset phases managed by the illustrated state machine. In each phase, predefined reset event indicating signals are issued by the reset generation module to drive the reset of specified parts of the device. Each phase is processed through waiting for a predefined minimum duration and until all processes of the respective reset phase that need to occur during that phase have been completed before proceeding to the next phase.

For instance, upon a power-up reset event or a destructive reset event, the operation of the reset generation module commences with reset phase 0 and further proceeds with the following reset phases 1 and 2 until the idle operation state is reached.

Upon entering the idle phase, a subsequent reset event signalized to the reset generation module may be processed. For instance, the subsequent reset event indicating signal may be a functional reset event. Accordingly, the operation of the reset generation module commences with reset phase 1 and further proceeds with reset phase 2. In case of a shortened functional reset event, the reset generation module commences with reset phase 2.

Figure 8:
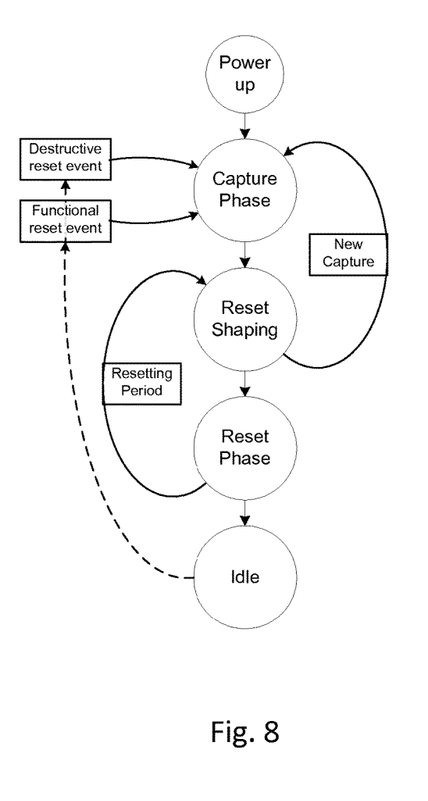
FIG. 8 shows a schematic state machine diagram for illustrating an exemplary operation of a reset state control circuit according to an example of the present application.

Referring now to FIG. 8, a schematic state machine diagram of a reset state control circuit according to an example of the present application for generating a dynamically adapted reset control flow. The exemplary diagram of FIG. 8 should be understood to supplement the description of the exemplary reset state control circuit 1 illustrated in FIG. 1 and described above with reference thereto.

Reset event indicating signals are received at the reset state control circuit 1. The signals may be issued by any internal or external reset sources and indicative of reset events thereof. The reset events may be hardware or software triggered events. Several reset event indicating signals may be received in parallel or reset event indicating signals may be received subsequently.

The one or more received reset event indicating signals may be supplied to a masking unit before being captured by the capturing logic 2. Once one or more reset event indicating signals are captured, the reset shaping logic 3 generates a reset control flow in response to the one or more reset event indicating signals and reset of one or more reset domains is triggered in accordance with the generated reset control flow. As described above, the reset control flow generated by the reset shaping logic 3 is dynamically adjusted in response to a sequence of captured reset events and properties thereof including among others the sequence order of the captured reset events, the time duration of the captured reset events, the period (temporal distance) between captured reset events, the type or category of the reset events. Upon capturing of a subsequent reset event, the reset shaping logic 3 is able to adjust dynamically the reset control flow in response thereto in particular as long as a current reset phase is not completed. Accordingly, the reset state control circuit is enabled to adjust dynamically the rest control flow in response to the reset event indicating signals received thereat. The responsiveness of the reset state control circuit according to an example of the present invention is provided to change dynamically the reset control flow. A reset event indicating signal triggers a reset control flow, which is predefined and associated with the reset event indicating signal. The predefined reset control flow is changed dynamically upon capturing of one or more subsequent reset event indicating signals, each of which would otherwise trigger independently a reset control flow, which is predefined and associated with respective the reset event indicating signal. The dynamically changed reset control flow considers the reset requirements of the captured reset events in the sequence thereof.

Figure 9:
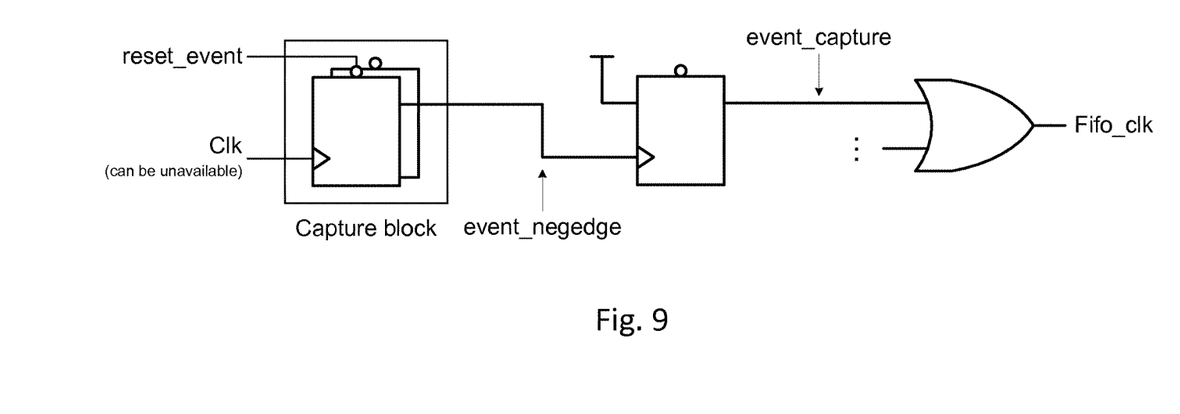
FIG. 9 shows a schematic circuit diagram illustrating an exemplary implementation of capture blocks within a capturing unit of a reset state control circuit according to an example of the present application.

FIG. 9 schematically illustrates an exemplary implementation of a capturing block within a capturing unit 2. The capturing unit 2 comprises multiple capture signal blocks, which are configured to capture corresponding reset event indicating signals received from reset signal sources. In the shown example, a capture block captures a corresponding reset event indicating signal and asserts an event-negedge signal asynchronously until the reset event is clocked by a clock signal Clk. The event-negedge signal is used to assert the reset asynchronously. The capture block comprises D-flip-flops clocked by a clock signal generated by a clock signal source. The clock signal source may be integrated in the system on chip 4. The captured reset event indicating signal may be applied to a logical gate, in particular an OR gate, to generate a FIFO clock signal, as illustrated in FIG. 9.

Figure 10:
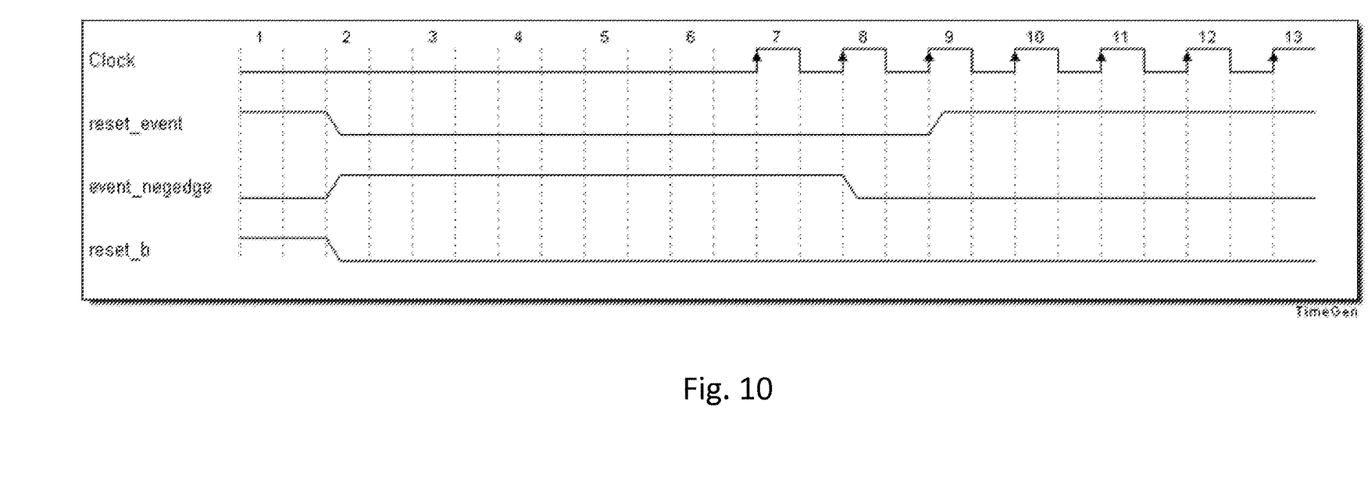
FIG. 10 schematically illustrates signal diagrams for showing the operation of the capturing block shown in FIG. 6.

FIG. 10 shows a simplified signal diagram for illustrating the operation of the reset capturing block illustrated in FIG. 9.

Figure 11:
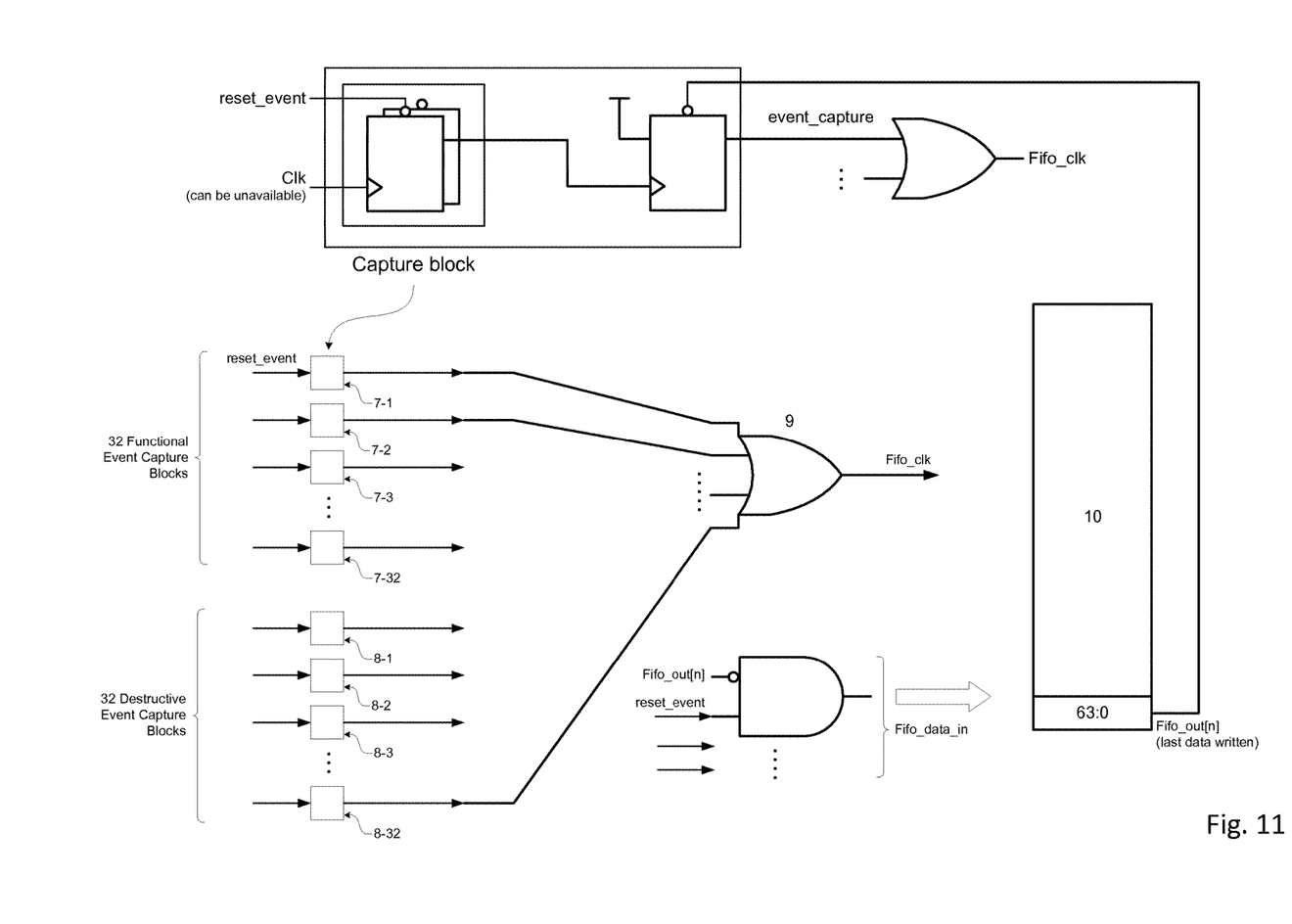
FIG. 11 schematically illustrates another exemplary implementation of a capturing unit within a reset state control circuit according to an example of the present application.

FIG. 11 schematically illustrates a further exemplary implementation of a capturing unit 2 within a reset state control circuit 1 according to the present application. In the shown example, there are 32 functional reset sources and up to 32 destructive reset sources, each connected via a reset event signaling line to a reset event capturing block. In the shown example, there are 32 reset event capturing blocks 7-1, 7-2, . . . , 7-32 for capturing functional reset events and 32 reset event capturing blocks 8-1, 8-2, . . . , 8-32 for capturing destructive reset events. The different captured reset events may be logically combined by a logical circuit 9 and/or filtered by a filtering or masking unit of the capturing unit 2 to generate a clock signal for a FIFO (first in first out) buffer 10. The clock signal of the logical circuit 9 is supplied to the FIFO buffer 10 within the capturing unit 2. The FIFI buffer 10 contains information about the sequence of captured reset events in the sequence order corresponding to the time of arrival or time of capturing of the reset event indicating signals. The FIFO buffer 10 is adapted to capture the received reset event indicating signals in accordance with the clock signal generated by the logical circuit 9, which may comprise a filtering or masking unit. Accordingly, the FIFO buffer 10 provides information about the functional and/or destructive reset events signalized to the reset state control circuit 1. The FIFO buffer 10 hence also provide information whether a particular reset event has occurred multiple times (back-to-back). The FIFO buffer 10 may be reset by an application once it is up. There is no loss of reset events, even when the clock signal is not available. In an example, information about the reset events stored in the FIFO buffer 10 may comprise time stamps assigned to the respective reset events. The reset event captured by the capturing unit 2, as exemplified in FIG. 11, may be hardware reset events or software reset events. The capturing unit 2 is adapted to capture the hardware and/or software reset events, wherein the reset shaping logic 3 is adapted to enable or disable different sequences or domains of the system on chip. In an example, the method and apparatus according to the present application makes use of different types of reset events or different linking of reset events and different manifestations of reset events during a reset shaping process.

Figure 3:
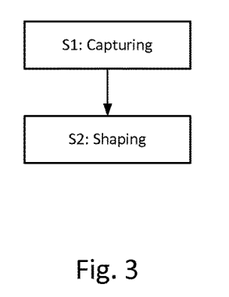
FIG. 3 schematically illustrates a simplified flowchart of a method for resetting an electronic device according to a further example of the present application.

The invention further provides a method for resetting an electronic device, as illustrated in FIG. 3 on the basis of an exemplary flow diagram according to the present application. In a stage S1, reset events from at least one reset source are captured. In a stage S2, the reset control flow to reset the device domains of the device is dynamically changed depending on the sequence of the captured reset events. The method illustrated in FIG. 3 may be performed by a reset state control circuit 1, as illustrated in FIG. 2. The method enables a linear reset flow to be changeable to an adaptive reset control based on various external and/or internal reset events, time to reset events and operation conditions. In this way, a reset handling of independent regions or domains of a system may be brought together. This allows the adaptive reset control flow to be shaped according on which reset event arrives first. Upon arrival and capturing of further reset events, the reset control flow is dynamically changed. The method and apparatus according to the present application allow reset machines or reset state machines, such as reset controllers, to be responsive to further occurring reset events in that the reset control flow is dynamically adapted during the reset operation. The reset events stored at least temporarily in the FIFO buffer 10 of the capturing unit 2, as illustrated in FIG. 11, may be further stored in a data memory for further data processing and evaluation. In an example, the reset events may be evaluated to find the underlying cause for the device reset. In an example, the memory for storing the reset events may be read out via pins of the system on chip by an analyzing unit. The read-out reset control flow can be analyzed to find causes for the different reset events and can be used to optimize the reset control flow generated by the reset state control circuit 1 in response to different reset event scenarios.

In the foregoing specification, the invention has been described with reference to specific examples of embodiments of the invention. It will be, however, evident that various modifications and changes may be made therein without departing from the broader spirit and scope of the invention as set forth in the appended claims.

The connections as discussed herein may be any type of connection suitable to transfer signals from or to the respective components, nodes, units or devices, for example via intermediate components. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. In addition, plurality of connections may be replaced with a single connection that transfers multiple signals serially or in a time-multiplexed manner. Likewise, single connections carrying multiple signals may be separated out into various different connections carrying subsets of these signals. Therefore, many options exist for transferring signals.

Those skilled in the art will recognize that the boundaries between blocks are merely illustrative and that alternative embodiments may merge blocks or circuit elements or impose an alternate decomposition of functionality upon various blocks or circuit elements. Thus, it is to be understood that the implementation depicted herein are merely exemplary, and that in fact many other implementation can be designed which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word "comprising" does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to distinguish arbitrarily between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method for resetting an electronic device having independent device domains, the method comprising:
   receiving signals indicating reset events from at least one reset source, wherein each reset event is indicative of at least one condition met which causes a reset to occur and wherein each reset event comprises one reset event selected from a group consisting of a power glitch reset event, tamper detect reset event, an open circuit error reset event, and an Error Correction Coding (ECC) error reset event;
   capturing the reset events;
   changing dynamically a reset control flow to reset one or more of the device domains of said electronic device depending on the sequence of captured reset events;
   assigning a time stamp to the captured reset events, and determining a time difference between captured reset events is determined on the basis of the assigned time stamps.

2. The method according to claim 1,
   wherein the reset control flow to reset said device domains is further changed dynamically depending on at least one selected from a group consisting of the time duration of the captured reset events and a determined time difference between the occurrence of the captured reset events.

3. The method according to claim 1,
   wherein the reset control flow to reset said device domains is further changed dynamically depending on types of the captured reset events.

4. The method according to claim 1,
   wherein the reset control flow to reset said device domains is further changed dynamically depending on at least one selected from a group consisting of an operation mode of the respective device domain and the operation mode of the overall electronic device.

5. The method according to claim 1, further comprising at least one of
   receiving an internal control signal generated by a control unit or an electronic device; and
   receiving an external control signal received by said electronic device,
   wherein the reset control flow to reset said device domains is further changed dynamically in response to at least one of the internal control signal and the external control signal.

6. The method according to claim 1,
   wherein the reset events comprise at least one selected from a group consisting of:
      internal reset events generated by internal reset sources of said electronic device and
      external reset events received from external reset sources connected to said electronic device.

7. A method for resetting an electronic device having independent device domains, the method comprising:
   receiving signals indicating reset events from at least one reset source, wherein each reset event is indicative of at least one condition met which causes a reset to occur;
   capturing the reset events;
   changing dynamically a reset control flow to reset one or more of the device domains of said electronic device depending on the sequence of captured reset events, wherein the reset events provided by the different reset sources are captured and applied to a reset state control circuit of said electronic device having a capturing unit that captures the reset events and a reset shaping logic which changes dynamically the reset control flow to reset the device domains of said electronic device in response to the captured reset events, and wherein device domains reset by said reset shaping logic are held in a reset state during reset phases, wherein the time duration of the reset phases depends on at least one selected from a group consisting of the sequence order of the captured reset events, the time duration of the captured reset events, the types of the captured reset events, a current operation state, and a current operation condition of the device domains of said electronic device, and wherein a time stamp is assigned to the captured reset events and wherein determining a time difference between captured reset events is determined on the basis of the assigned time stamps.

8. The method according to claim 7,
   wherein the reset shaping logic of said reset state control circuit changes dynamically the reset control flow to reset the device domains depending on at least one selected from a group consisting of a sequence order of the captured reset events, a time duration of the captured reset events, the types of the captured reset events, ongoing operation modes of the device domains, the current operation mode of the overall electronic device, internal control signals generated by a control unit of the electronic device, and external control signals received by the electronic device.

9. The method according to claim 7, wherein the reset events provided by the different reset sources are applied in parallel to the capturing unit of said reset state control circuit comprising a masking unit which masks the applied reset events.

10. A reset state control circuit adapted to reset independent device domains of an electronic device, said reset state control circuit comprising:
one or more inputs adapted to receive signals indicating reset events from at least one reset source, wherein each reset event is indicative of at least one condition met which causes a reset to occur, and wherein each reset event comprises one reset event selected from a group consisting of a power glitch reset event, tamper detect reset event, an open circuit error reset event, and an Error Correction Coding (ECC) error reset event;
a capturing unit adapted to capture the reset events, wherein the capturing unit is configured to assign a time stamp to the captured reset events and wherein determining a time difference between captured reset events is determined on the basis of the assigned time stamps; and
a reset shaping logic adapted to change dynamically a reset control flow to reset one or more device domains of said electronic device depending on a sequence of the reset events captured by said capturing unit.

11. The reset state control circuit according to claim 10, wherein the capturing unit comprises capturing blocks adapted to capture at least one of internal reset events received from internal reset sources and external reset events received from external reset sources.

12. The reset state control circuit according to claim 11, wherein the reset sources are reset controllers provided for independent device domains of said electronic device.

13. The reset state control circuit according to claim 10, wherein the reset shaping logic is adapted to change dynamically the reset control flow to reset device domains depending on at least one selected from a group consisting of a sequence order, a time duration of the captured reset events, the types of the captured reset events, current operation modes of the device domains, the current operation mode of the overall electronic device, internal control signals generated by a control unit of the electronic device, and external control signals received by said electronic device.

14. The reset state control circuit according to claim 10, wherein the reset shaping logic is a programmable circuit or formed by a hardwired circuit.

15. An electronic device comprising at least one independent device domain and a reset control circuit according to claim 10.

16. A system on chip comprising an integrated reset state control circuit according to claim 10.

* * * * *